July 26, 1932.  A. D. J. ELIE  1,869,241
SEPARATION OF SOLID SUBSTANCES
Filed Jan. 24, 1930  2 Sheets-Sheet 1

A. D. J. Elie
INVENTOR

By: Marks & Clerk
Attys.

July 26, 1932.  A. D. J. ELIÉ  1,869,241
SEPARATION OF SOLID SUBSTANCES
Filed Jan. 24, 1930   2 Sheets-Sheet 2
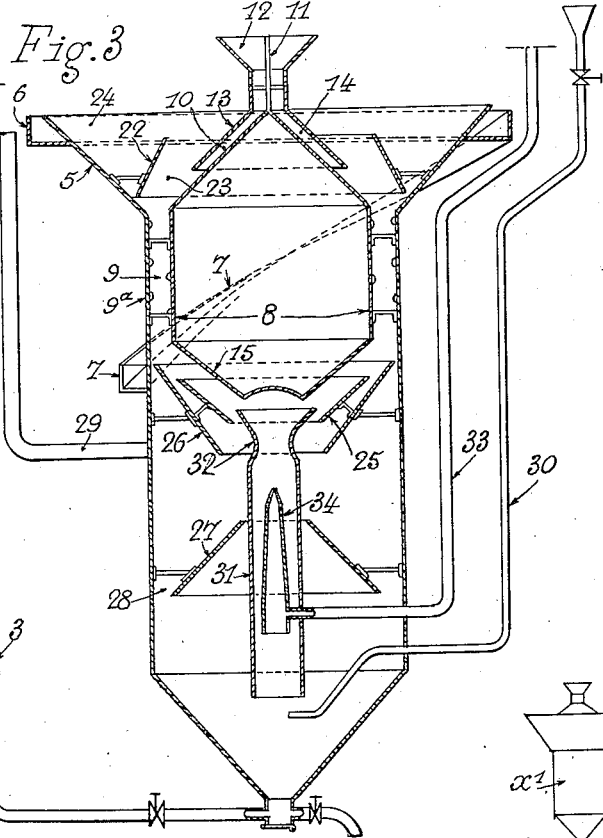
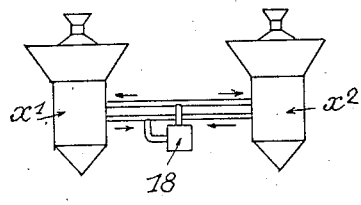
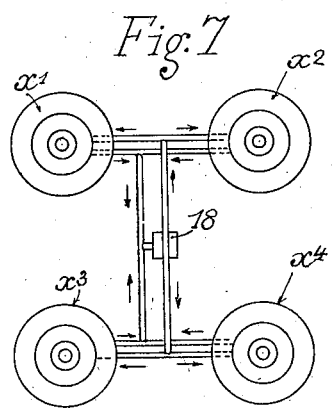
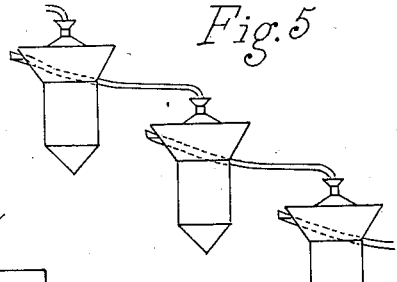
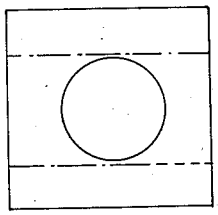
A. D. J. Elie
INVENTOR
By: Marks & Clerk
Att'ys.

Patented July 26, 1932

1,869,241

UNITED STATES PATENT OFFICE

ALEXIS DÉSIRÉ JOSEPH ELIÉ, OF TANANARIVE, MADAGASCAR

SEPARATION OF SOLID SUBSTANCES

Application filed January 24, 1930, Serial No. 423,279, and in France March 29, 1929.

The invention relates to the separation of solid substances, and more particularly to a method and an apparatus for separating minerals, such as graphite, from its ore, by the emulsion process.

In the known methods for the extraction of mineral substances or for enriching the ores by the emulsion process, the raw material containing the mineral substance or substances to be removed is mixed with an emulsion consisting of a liquid medium such as water, with an emulsifying substances, such as cresyl, oils or the like. This process requires a great power, and the apparatus is subject to a considerable wear, chiefly when the mineral substances are very hard. On the contrary, if such mineral substances are of a friable nature, these are crumbled with a resulting loss; furthermore, due to such crumbling of the material it is difficult to produce an emulsion, as certain ores or minerals or their gangue produce a colloidal solution which prevents the formation of foam, and such minerals must be subjected to a preliminary operation, prior to the emulsion process.

The present invention has for its object to obviate the aforesaid drawbacks; another object of the invention is to devise a plant wherein the emulsifying agent, which may consist of an emulsion of a liquid such as water or the like with cresyl or similar emulsifying substance, mixed with air or suitable gas, is prepared in a place which is distinct from the region where the mineral substance to be treated is emulsified.

Another object of the invention is to provide a plant wherein the emulsion, such as water or other liquid with a gas, to which is added an emulsifying substance, is circulated in a closed circuit.

Further characteristics of the invention are specified in the following description.

In the accompanying drawings, which are given solely by way of example;

Figure 3 is a vertical section of a modified construction.

Figure 4 is a plan view of an apparatus in which the foam receiver has a square shape.

Figure 5 is a diagrammatic elevational view of a plant comprising a set of apparatus disposed in series.

Figure 6 is a diagrammatic elevational view of a modified plant, and

Figure 7 is the corresponding plan view.

Figure 1:
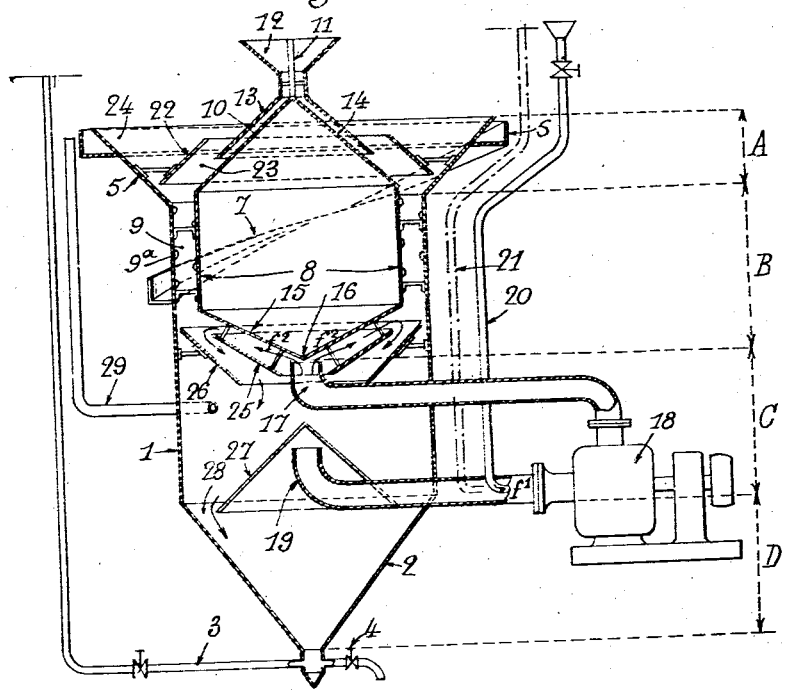
Figure 1 is a vertical section of a plant according to the invention which comprises a single emulsifying apparatus, Figure 2:
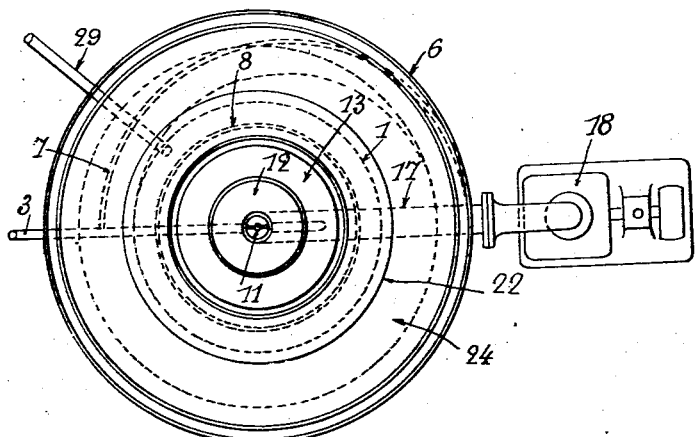
Figure 2 is the corresponding plan view.

In the construction shown in Figures 1 and 2, the apparatus comprises a cylindrical metallic body 1, having a tapered bottom 2 provided with an emptying cock or valve 4, preferably associated with a stream of pressure liquid inlet 3 for blowing out the waste substances through cock 4. Said body 1 is formed at the upper part with a truncated portion 5 or foam receiver (so-called "spitz") for collecting the foam containing the emulsified mineral substance.

The truncated portion 5 is surrounded by an annular trough 6 which has a slight slope and ends in a very inclined helical chute 7 surrounding the body 1.

At the upper part of body 1 and concentrically therewith, is disposed a liquid-tight cylinder 8 with conical upper and lower closures 10, 15. Between walls 1 and 8 is an annular space 9 preferably provided with small baffles 9ª or projections. The tapered upper end 10 of cylinder 8 carries a vertical stud 11 upon which is mounted in any suitable manner a funnel 12 having a lower tapered portion 13 which is parallel to the tapered part 10, thus leaving between them an annular space 14 for the passage of the ore or like raw material which is loaded through hopper 12.

The apex 16 of the conical bottom 15 of cylinder 8 is situated substantially midway of the height of body 1.

An emulsion supply conduit 17 opens upwardly below the apex 16 of bottom 15; the emulsifying agent may consist of water (or other liquid) and cresyl or like emulsifying substance and is adapted to form an emulsion with air or gas, in a mixing device 18 of any suitable type, for example a contrifugal pump located outside the apparatus.

Below the conduit 17 is an intake conduit 19 by which the liquid (water) and the emulsifying substance is withdrawn and is returned to the mixing pump 18. Into conduit 19 opens a pipe 20 adapted for the supply of the emulsifying substance such as cresol, turpentine, tar, petrol etc. The emulsifying substance, which is introduced when necessary, flows in the direction of arrow $f1$. Tube 20 may also be adapted for the supply of atmospheric air, sucked in by mixing pump 18. If compressed air, or a special gas, is used, provision is made of a separate gas supply tube 21.

This apparatus also comprises a certain number of partitions and baffles, namely: At the upper part, a tapered partition 22 divides the foam receiver 5 into two chambers, viz., an inner chamber 23 connected to the annular space 9, and an outer or peripheral chamber connected to chamber 23 above partition 22.

Below the tapered bottom 15 of cylinder 8 and adjacent conduit 17 are disposed two coaxial tapered baffles 25—26. At a short distance above the intake conduit 19 is mounted a tapered member 27, leaving between it and the wall of body 1 an annular space 28. These various partitions and baffles are supported by suitable fixtures.

For the sake of clearness, the apparatus has been mentally divided into four regions A, B, C, D, (Fig. 1) separated by three horizontal planes. A is the foam collecting region, B the emulsion region, C is the settling region and D the waste collecting region.

In operation, the mixing pump 18 is started. Air or gas is withdrawn or forced under pressure through pipe 20 or 21. If necessary, a certain amount of emulsifying substance can be added through pipe 20. Pump 18 produces an emulsion comprising the liquid (such as water) the emulsifying substance (such as cresyl, petrol or the like) and air or another gas, and this emulsion is delivered through conduit 17 into the apparatus at the lower part of the emulsion region C; the tapered baffle 25 guides the emulsion to a point below the tapered bottom 15 of cylinder 8, according to the arrows $f2$.

The emulsifying bubbles which are formed at high pressure in the pump 18 are given off, and they rise through the space 9 (emulsion region B). The emulsifying medium consisting of the liquid and the emulsifying agent flows down between the tapered members 25 and 26, reaches the annular space 28 and flows upwardly to the conduit 19 by which it is returned to the mixing pump 18. The emulsive agent thus circulates in a closed circuit.

Due to the provision of tapered baffle 27, the suction takes place at the periphery at a slow speed, and the emulsified mineral substance is practically prevented from being drawn into the mixing pump.

The mineral substance is supplied through funnel 12 in a semi-fluid state, due to a slight addition of oil or kerosene, and flows down between the top 10 of cylinder 8 and baffle 13 and then proceeds into the annular space 9 (emulsion region B). On its downward movement in said region, it meets with the rising air or gas bubbles, which produces a mixture or emulsion of the semi-fluid mineral substance with the air or gas; the formation of said emulsion is furthered by the baffles or projections $9^a$ by which eddies are produced in this space.

Obviously, the height of the region 3 will be varied according to the nature of the mineral substance employed, and the diameters of the parts 1 and 8 may be adjusted according to the desired output. The section of space 9 may be reduced in order to increase the proportion or density of the air or gas bubbles, and their pressure is regulated by the speed of the mixing device, and in some cases by the pressure of the gas and the amount of emulsifying substance added to the liquid.

The foam (that is the emulsion of the mineral substance) collects at the upper part of the foam collecting region A. Partition 22 deflects the rising emulsion towards the centre and thus reduces the eddies of the foam, and prevents it from mixing with the raw material supplied through 14.

This foam may be removed by delivering liquid at 23 for causing the foam to overflow, without affecting the region C. The foam is collected in channel 6. It may also be removed by any other suitable mechanical or manual means, but, in this case, an overflow is to be avoided, which may be readily obtained by the use of an overflow pipe 29 opening at a point somewhat below the upper level of the foam-receiver.

The waste products or the mineral substance, which are not buoyant, fall down along the baffle 26, and collect at the bottom 2, from which they are discharged in a continuous or intermittent manner, either by gravity, or by the use of a stream of liquid or steam discharged through pipe 3. The waste products may be collected below the apparatus, or they may be taken up by an elevating device (not shown), a screw conveyor or the like.

Fig. 3 illustrates a similar apparatus in which the said mixing device 18 is eliminated, the liquid, such as water, and the emulsifying substance remaining constantly in the main body 1. In this example, the emulsifying substance is supplied at will through a pipe 30. An emulsifying device is disposed at the centre of the apparatus and below the tapered member 27, and comprises a central vertical tube 31, having a restricted part 32 below which is disposed a coaxial tube 34, pierced with small orifices for the upward exit of compressed air or gas supplied through a conduit 33. Due to the suction effect of the air, the liquid and the emulsifying substance rise in tube 31 and form an emulsion with the air, the function of the emulsion being the same as above specified.

Obviously, the apparatus may have other shapes than those represented in Figures 1 to 3; for instance, the foam receiver (Figure 4) may have a square or a rectangular form, by which the removal of the foam will be facilitated in certain cases.

A certain number of apparatus $X^1, X^2, X^3, X^4$, (Figures 6 and 7) may be arranged in a battery in cooperation with a single emulsifying device 18.

The apparatus, supplied by a common emulsifying device or by several emulsifying devices, may be mounted in series; in this manner it is possible to classify different substances, or to obtain a purer foam.

Obviously, the invention is not limited to the details of constructions above specified, which are given solely by way of example.

Having now described my invention what I claim as new and desire to secure by Letters Patent is:

1. A plant for the separation of solid substances from a raw material by the emulsion process, comprising a receptacle, an impervious central structure coaxial with said receptacle and leaving an annular space, between both, a conical top member above said structure, a loading funnel above the apex of said top member, means for delivering an emulsion below said structure, a settling chamber below said annular space, means for withdrawing clear liquid from said settling chamber, and emulsifying means between said delivering means and said withdrawing means.

2. A plant as claimed in claim 1 comprising an upwardly flaring chamber above said annular recess, a partition substantially parallel with said top member for deflecting the foam produced inwardly, whereby said foam may proceed over the edge of said partition into the outer portion of said chamber, and an inclined trough for receiving the overflowing foam from said chamber.

3. A plant as claimed in claim 1 comprising a conical baffle extending from the base of said funnel paralled with said top member for separating the descending loaded material from the ascending foam.

4. A plant as claimed in claim 1 comprising baffles in said annular space.

5. A plant as claimed in claim 1, wherein the bottom wall of said structure comprises a downwardly tapering portion facing the outlet of said emulsion delivering means, and which comprises two substantially conical baffles, spaced from one another and from said tapering portion, for guiding the emulsion upwardly toward said annular space and the nonemulsified portion of the liquid downwardly toward said settling chamber.

6. A plant as claimed in claim 1, comprising a hood covering the intake orifice of said withdrawing means.

7. A plant for the separation of solid substances from a raw material by the emulsion process, comprising a receptacle, an impervious central structure coaxial with said receptacle and leaving an annular space, between both, a conical top member above said structure, a loading funnel above the apex of said top member, an air under pressure emulsifier-exhauster, a settling chamber below said annular space, means for withdrawing clear liquid from said settling chamber, and emulsifying means between said delivering means and said withdrawing means.

8. A plant for the separation of solid substances from a raw material by the emulsion process, comprising a receptacle, an impervious central structure coaxial with said receptacle and leaving an annular space, between both, a conical top member above said structure, a loading funnel above the apex of said top member, means for delivering an emulsion below said structure, a settling chamber below said annular space, means for withdrawing clear liquid from said settling chamber and further emulsifying means between said delivering means and said withdrawing means.

9. A plant for the separation of solid substances from a raw material by the emulsion process, comprising a receptacle, an impervious central structure coaxial with said receptacle and leaving an annular space, between both, a conical top member above said structure, a loading funnel above the apex of said top member, an air under pressure emulsifier-exhauster, a settling chamber below said annular space, means for withdrawing clear liquid from said settling chamber, and further emulsifying means between said delivering means and said withdrawing means.

10. A process for the separation of solid substances from a raw material in which an emulsion is prepared by beating of air, water and a nonoily emulsifying substance, said emulsion is circulated while being subjected to a fall of pressure, whereby a layer of air bubbles is formed over the surface of said emulsion, slightly oiling the material to be treated, bringing the oiled material into contact with said layer without agitation and separating the froth so formed.

11. A process for the separation of solid substances from a raw material in which an emulsion is prepared under relatively high pressure by beating of air, water and a nonoily emulsifying substance, said emulsion is circulated while being subjected to a fall of pressure whereby a layer of air bubbles is forced over the surface of said emulsion, slightly oiling the material to be treated, bringing the oiled material into contact with said layer without agitation and separating the front so formed.

In testimony whereof I have signed my name to this specification.

ALEXIS DÉSIRÉ JOSEPH ELIÉ.